United States Patent
Harris et al.

(10) Patent No.: US 7,561,565 B2
(45) Date of Patent: Jul. 14, 2009

(54) VXS PAYLOAD MODULE HAVING A STORAGE MODULE AND METHOD

(75) Inventors: Jeffrey M. Harris, Chandler, AZ (US); Robert C. Tufford, Chandler, AZ (US)

(73) Assignee: Emerson Network Power - Embedded Computing, Inc., Madison, WI (US)

(*) Notice: Subject to any disclaimer, the term of this patent is extended or adjusted under 35 U.S.C. 154(b) by 338 days.

(21) Appl. No.: 10/871,439

(22) Filed: Jun. 17, 2004

(65) Prior Publication Data

US 2005/0281254 A1 Dec. 22, 2005

(51) Int. Cl.
*H04L 12/50* (2006.01)
(52) U.S. Cl. .................. 370/386; 370/387; 370/401; 370/422; 710/305; 710/306
(58) Field of Classification Search ................. 370/254, 370/257, 363, 368, 371, 374, 378, 381, 386, 370/395, 387, 401, 422; 710/21, 305, 306; 711/114
See application file for complete search history.

(56) References Cited

U.S. PATENT DOCUMENTS

| | | | | |
|---|---|---|---|---|
| 5,499,341 A | * | 3/1996 | Wilson et al. | 710/21 |
| 6,052,278 A | * | 4/2000 | Tanzer et al. | 361/685 |
| 6,112,276 A | * | 8/2000 | Hunt et al. | 711/112 |
| 6,813,676 B1 | * | 11/2004 | Henry et al. | 710/316 |
| 2004/0010660 A1 | * | 1/2004 | Konshak et al. | 711/114 |

* cited by examiner

*Primary Examiner*—William Trost, IV
*Assistant Examiner*—Toan D Nguyen
(74) *Attorney, Agent, or Firm*—Harness, Dickey & Pierce, P.L.C.

(57) ABSTRACT

A multi-service platform system (100) includes a VXS backplane (104), a switched fabric (106) operating on the VXS backplane, a parallel bus (108) operating coincident with the switched fabric on the VXS backplane, a VXS payload module (102) coupled to the VXS backplane, and a storage module (110) coupled to the VXS payload module, wherein the storage module is coupled to communicate with the switched fabric.

19 Claims, 4 Drawing Sheets

VXS PAYLOAD MODULE HAVING A STORAGE MODULE AND METHOD

BACKGROUND OF THE INVENTION

Storage devices mounted on a payload board can be added to embedded computer systems to increase or augment storage capacity. Storage devices generally communicate to external devices using a storage protocol, such as SCSI, IDE/ATA, and the like. In order to transmit data stored on storage devices, data is generally communicated from the storage devices to an embedded computer system using primarily a multi-drop parallel bus network architecture, such as Peripheral Component Interconnect (PCI) or VERSAmodule Eurocard (VMEbus). A multi-drop parallel bus architecture has the disadvantage that it can only be used to support one instantaneous communication between modules in a computer system or network. Some applications have requirements for simultaneous high bandwidth transfers between storage devices and other devices, such as processors located elsewhere in the embedded computing environment, which cannot be handled by the multi-drop parallel bus architecture.

Accordingly, there is a significant need for an apparatus and method that overcomes the deficiencies of the prior art outlined above.

BRIEF DESCRIPTION OF THE DRAWINGS

Referring to the drawing.

Figure 1:
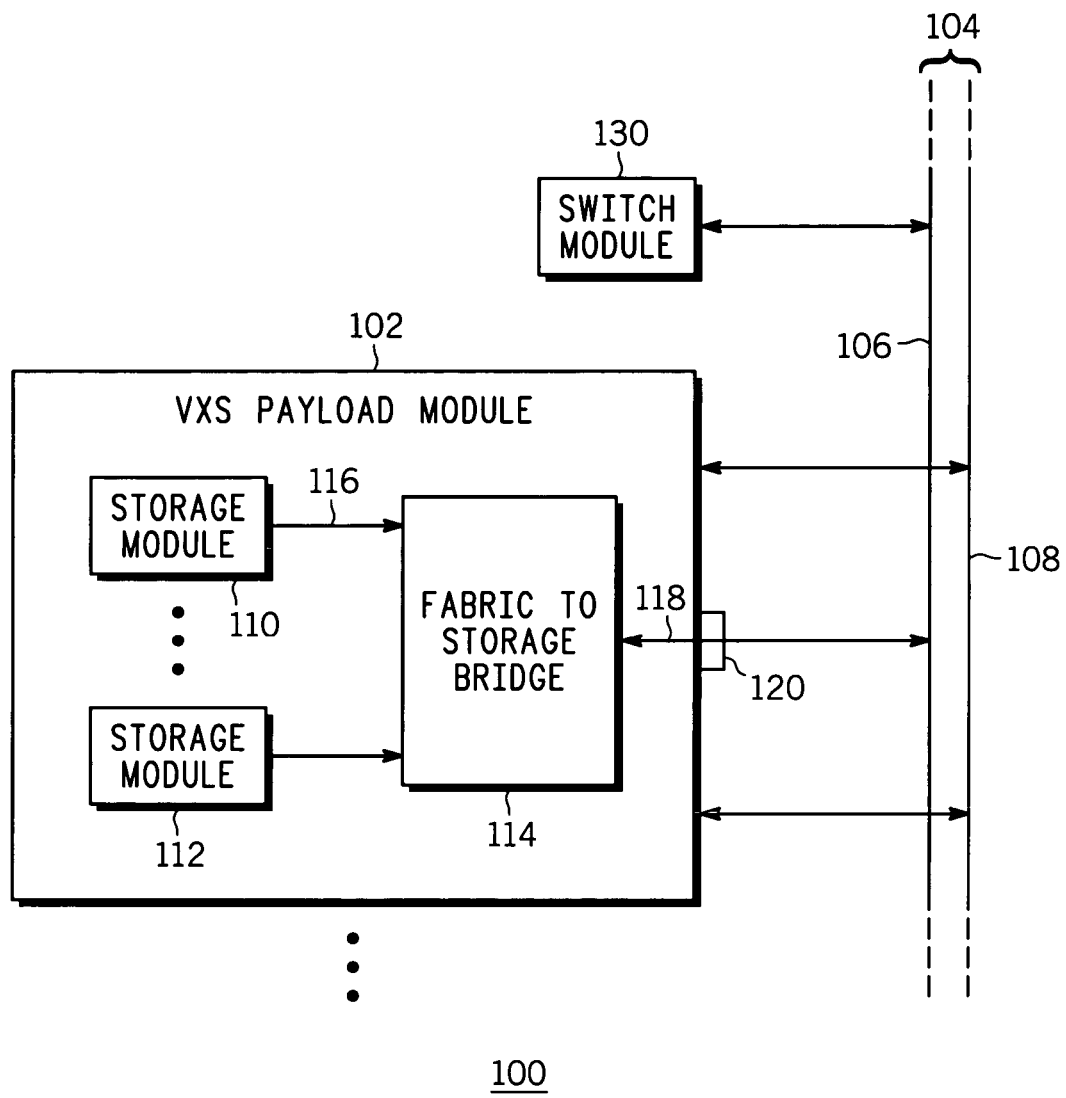
FIG. 1 depicts a multi-service platform system according to one embodiment of the invention.

It will be appreciated that for simplicity and clarity of illustration, elements shown in the drawing have not necessarily been drawn to scale. For example, the dimensions of some of the elements are exaggerated relative to each other. Further, where considered appropriate, reference numerals have been repeated among the Figures to indicate corresponding elements.

DESCRIPTION OF THE PREFERRED EMBODIMENTS

In the following detailed description of exemplary embodiments of the invention, reference is made to the accompanying drawings, which illustrate specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

For clarity of explanation, the embodiments of the present invention are presented, in part, as comprising individual functional blocks. The functions represented by these blocks may be provided through the use of either shared or dedicated hardware, including, but not limited to, hardware capable of executing software. The present invention is not limited to implementation by any particular set of elements, and the description herein is merely representational of one embodiment.

FIG. 1 depicts a multi-service platform system 100 according to one embodiment of the invention. A multi-service platform system 100 can include one or more embedded-type computer chassis, with software and any number of slots for inserting modules. Modules can add functionality to multi-service platform system 100 through the addition of processors, memory, storage devices, and the like. A backplane connector is used for connecting modules placed in the slots.

As an example of an embodiment, a multi-service platform system 100 can include one or more chassis and modules conforming to the VERSAmodule Eurocard (VMEbus) switched serial standard (VXS) as set forth in VITA 41 promulgated by VMEbus International Trade Association (VITA), P.O. Box 19658, Fountain Hills, Ariz., 85269. VXS includes a packet switched network, known as a switched fabric 106, on a VXS backplane 104 coincident with a parallel bus 108. VXS backplane is defined to include a switched fabric 106 coincident with parallel bus 108. In other words, VXS backplane 104 includes both switched fabric 106 and parallel bus 108 in the same physical backplane structure such that a VXS payload module 102 coupled to VXS backplane 104 can communicate using one or both of switched fabric 106 and parallel bus 108.

In an embodiment, multi-service platform system 100 can be controlled by a platform controller (not shown for clarity), which can include a processor for processing algorithms stored in memory. Memory comprises control algorithms, and can include, but is not limited to, random access memory (RAM), read only memory (ROM), flash memory, electrically erasable programmable ROM (EEPROM), and the like. Memory can contain stored instructions, tables, data, and the like, to be utilized by processor. Platform controller can be contained in one, or distributed among two or more payload modules with communication among the various modules of multi-service platform system 100.

In an embodiment, parallel bus 108 can be a VMEbus network, which is a parallel multi-drop bus network. VMEbus network is defined in the ANSI/VITA 1-1994 and ANSI/VITA 1.1-1997 standards, promulgated by the VMEbus International Trade Association (VITA), P.O. Box 19658, Fountain Hills, Ariz., 85269 (where ANSI stands for American National Standards Institute). In an embodiment of the invention, devices communicating using VMEbus network can communicate using VMEbus based protocols such as Single Cycle Transfer protocol (SCT), Block Transfer protocol (BLT), Multiplexed Block Transfer protocol (MBLT), Two Edge VMEbus protocol (2eVME) and Two Edge Source Synchronous Transfer protocol (2eSST). VMEbus network is not limited to the use of these VMEbus based protocols and other VMEbus based protocols are within the scope of the invention.

In one embodiment, switched fabric 106 can use a switch module 130 as a central switching hub with any number of VXS payload modules 102 coupled to switch module 130 via switched fabric 106. Switch module can be located in a different slot within multi-service platform system 100. In an embodiment, switched fabric 106 can be based on a point-to-point, switched input/output (I/O) fabric, whereby cascaded switch devices interconnect end node devices. Switched fabric 106 can include both module-to-module (for example computer systems that support I/O module add-in slots) and chassis-to-chassis environments (for example interconnecting computers, external storage systems, external Local Area Network (LAN) and Wide Area Network (WAN) access devices in a data-center environment). Switched fabric 106 can be implemented by using one or more of a plurality of switched fabric network protocols, for example and without limitation, InfiniBand™, Serial RapidIO™, FibreChannel™, Ethernet™, PCI Express™, Hypertransport™, and the like. Switched fabric 106 is not limited to the use of these switched fabric network protocols and the use of any switched fabric network protocol is within the scope of the invention.

In an embodiment of the invention, parallel bus 108 and switched fabric 106 operate concurrently within multi-service platform system 100. In an example of an embodiment, parallel bus 108 can operate as a control plane by synchronizing and organizing activities in multi-service platform system 100. Switched fabric 106 can operate as a data plane by transferring data between individual VXS payload modules 102. In this embodiment, data is transferred faster through the higher bandwidth switched fabric 106, while the parallel bus 108 controls and manages the overall system. This has the effect of increasing the speed of multi-service platform system 100 since data transfers that are in excess of parallel bus 108 bandwidth can take place using switched fabric 106.

In another embodiment of the invention, parallel bus 108 can be used as the data plane and switched fabric 106 can be used as the control plane. In yet another embodiment of the invention, parallel bus 108 and switched fabric 106 each can operate as both the control plane and the data plane.

Multi-service platform system 100 can include one or more VXS payload modules 102 coupled to VXS backplane 104. VXS backplane 104 can include hardware and software necessary to implement a coincident parallel bus 108 and a switched fabric 106.

Multi-service platform system 100 can include VXS payload module 102 having one or more storage modules 110, 112. For example, VXS payload module 102 can include first storage module 110 and second storage module 112. In an embodiment, VXS payload module 102 can have a VMEbus board form factor. VMEbus form factor, including mechanical dimensions, electrical specifications, and the like are known in the art and set forth in the ANSI/VITA 1-1994 and ANSI/VITA 1.1-1997 standards.

Storage modules 110, 112 can include any device or medium for storing data. For example, storage modules 110, 112 can include spinning magnetic media or optical drives such as hard drives, CD-ROM drives, and the like. In another embodiment, storage modules 110, 112 can include solid-state storage devices such as RAM, flash memory, EEPROM, and the like. Any type of data storage device is within the scope of the invention.

Storage modules 110, 112 can send and receive data using any storage protocol 116 known in the art. For example, storage modules can use Small Computer System Interface (SCSI), Integrated Drive Electronics/AT Attachment (IDE/ATA), Enhanced IDE (EIDE), Fibrechannel, Internet SCSI (ISCSI), and the like. The invention is not limited by these storage protocols 116, and other storage protocols 116 are within the scope of the invention.

VXS payload module 102 can include at least one fabric-to-storage bridge 114. In an embodiment, fabric-to-storage bridge 114 translates data leaving storage modules 110, 112 from storage protocol 116 to switched fabric protocol 118. Also, fabric-to-storage bridge 114 functions to translate incoming packets in switched fabric protocol 118 to storage protocol 116. In an embodiment, switched fabric protocol 118 can include any packet based protocol used on a switched fabric 106, for example, InfiniBand™, Serial RapidIO™, FibreChannel™, Ethernet™, PCI Express™, Hypertransport™, and the like.

In an embodiment of the invention, VXS backplane 104 and VXS payload module 102 have a set of interlocking connectors designed to interlock with each other when VXS payload module 102 is placed in a slot of multi-service platform system 100. The mechanical and electrical specifications for a portion of these interlocking connectors can be found in the ANSI/VITA 1-1994 and ANSI/VITA 1.1-1997 standards cited above for VMEbus systems. For example, these standards define the mechanical envelopes P0, P1 and P2 on VXS payload module, and corresponding mechanical envelopes J0, J1 and J2 on VXS backplane 104. Connectors in the P0/J0, P1/J1 and P2/J2 mechanical envelopes interlock when payload VXS payload module 102 is placed in a slot of multi-service platform system 100.

In an embodiment, connectors in the P1/J1 and P2/J2 mechanical envelopes couple VXS payload module 102 to parallel bus 108, while switched fabric connector 120 in the P0/J0 mechanical envelope couples VXS payload module 102 to switched fabric 106. When VXS payload module 102 is placed in a slot of multi-service platform system 100 and coupled to VXS backplane 104 via connectors in the P1/J1 and P2/J2 mechanical envelopes, the functionality of VXS payload module 102 can be added to multi-service platform system 100 via parallel bus 108.

In an embodiment, VXS payload module 102 has switched fabric connector 120 in the P0 mechanical envelope. VXS backplane 104 can include corresponding switched fabric connector in the J0 mechanical envelope (not shown for clarity), where switched fabric connector 120 and corresponding switched fabric connector are designed to interface and interlock when VXS payload module 102 is inserted into multi-service platform system 100. Switched fabric connector 120 and corresponding switched fabric connector are designed for use in high-speed switched fabric networks and are compatible with any of a plurality of switched fabric network protocols as described above. In an example of an embodiment of the invention, switched fabric connector 120 and corresponding switched fabric connector can be a Tyco MultiGig RT connector manufactured by the AMP division of Tyco Electronics, Harrisburg, Pa. The invention is not limited to the use of the Tyco RT connector, and any connector capable of handling data using any of the plurality of switched fabric network standards is encompassed within the invention.

Figure 2:
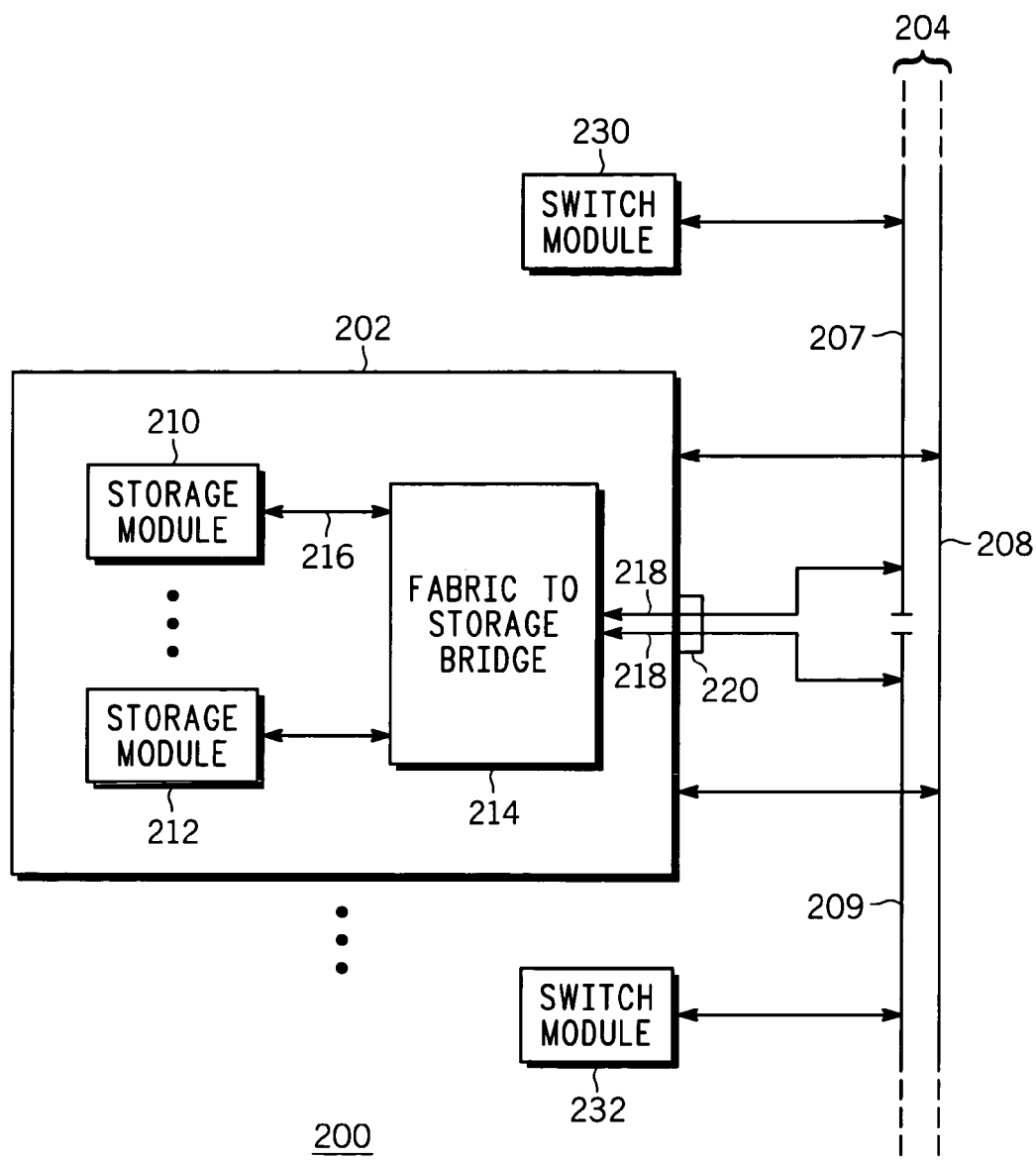
FIG. 2 depicts a multi-service platform system according to another embodiment of the invention.

FIG. 2 depicts a multi-service platform system 200 according to another embodiment of the invention. As shown in FIG. 2, switched fabric comprises first switched fabric 207 and second switched fabric 209 both of which are coincident on VXS backplane 204 with parallel bus 208. In an embodiment, first switched fabric 207 can be controlled by first switch module 230, and second switched fabric 209 can be controlled by second switch module 232. Both first switch module 230 and second switch module 232 can be located in separate slots within multi-service platform system 200.

As in FIG. 1, first storage module 210 and second storage module 212 communicate with fabric-to-storage bridge 214 using storage protocol 216. Fabric-to-storage bridge 214 functions to translate data between storage protocol 216 and switched fabric protocol 218 as described above. Storage modules 210, 212 are coupled to VXS backplane 204 though switched fabric connector 220 as described above.

In an embodiment, first storage module 210 can store data exclusively for first switched fabric 207 or exclusively for second switched fabric 209. Also, second storage module 212 can store data exclusively for second switched fabric 209 or first switched fabric 207. As an example, if first storage module 210 is dedicated exclusively to first switched fabric 207, then only data communicated over first switched fabric 207 can be stored on first storage module 210. In this embodiment, VXS payload module 202 can be pre-configured so as to assign first storage module 210 or second storage module 212 to one of first switched fabric 207 or second switched fabric 209. In another embodiment, both storage modules 210, 212 can be assigned to the same switched fabric, for example first switched fabric 207. Any combinations of storage module assignments to particular switched fabrics are within the scope of the invention. Although two storage modules are depicted in FIG. 2, any number of storage modules coupled to VXS payload module 202 is within the scope of the invention.

Figure 3:
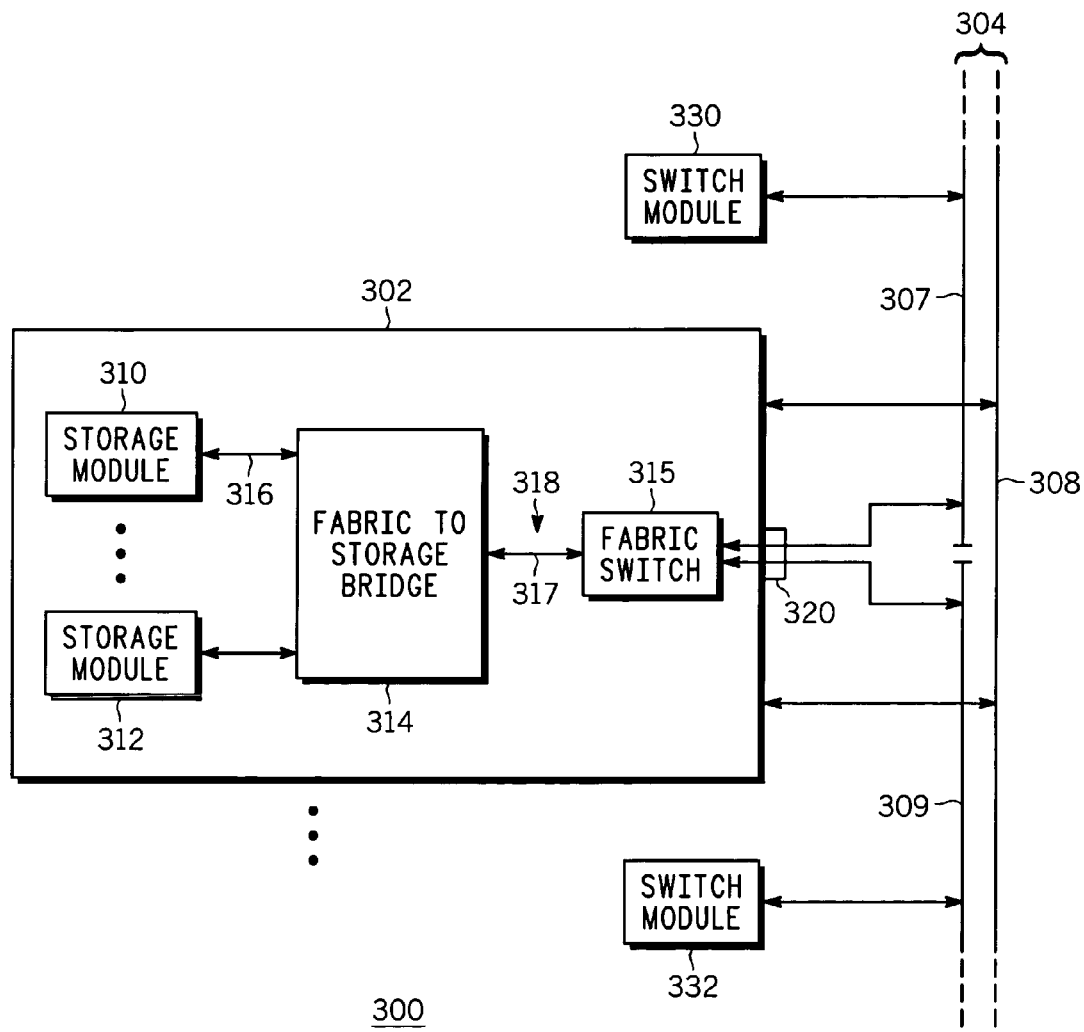
FIG. 3 depicts a multi-service platform system according to yet another embodiment of the invention.

FIG. 3 depicts a multi-service platform system 300 according to yet another embodiment of the invention. As shown in FIG. 3, switched fabric comprises first switched fabric 307 and second switched fabric 309 both of which are coincident on VXS backplane 304 with parallel bus 308. In an embodiment, first switched fabric 307 can be controlled by first switch module 330, and second switched fabric 309 can be controlled by second switch module 332. Both first switch module 330 and second switch module 332 can be located in separate slots within multi-service platform system 300.

As in FIG. 1, first storage module 310 and second storage module 312 communicate with fabric-to-storage bridge 314 using storage protocol 316. Fabric-to-storage bridge 314 functions to translate data between storage protocol 316 and switched fabric protocol 318 as described above. Storage modules 310, 312 are coupled to VXS backplane 304 though switched fabric connector 320 as described above.

As shown in FIG. 3, VXS payload module 302 includes fabric switch 315 communicatively interposed between fabric-to-storage bridge 314 and switched fabric connector 320. In an embodiment, fabric switch 315 can act as a router for storage modules 310, 312 on VXS payload module 302. Both first storage module 310 and second storage module 312 are coupled to directly communicate with at least one of first switched fabric 307 and second switched fabric 309 via fabric switch 315.

In an embodiment, fabric switch 315 routes incoming and outgoing data such that data is routed to or from first storage module 310 or second storage module 312 respectively, and to or from first switched fabric 307 or second switched fabric 309 respectively. In an embodiment, first storage module 310 can store data exclusively for first switched fabric 307 or exclusively for second switched fabric 309. Also, second storage module 312 can store data exclusively for second switched fabric 309 or first switched fabric 307. In another embodiment, one or more of storage modules 310, 312 can be shared storage for data communicated on first switched fabric 307 and second switched fabric 309. Fabric switch 315 can route data to and from storage modules 310, 312 via a single fabric switch link 317. In this embodiment, fabric switch 315 must route data packets to storage modules 310, 312 one at a time and cannot route data to both storage modules 310, 312 simultaneously.

In an embodiment, fabric switch 315 can be controlled externally by either switch module 330, 332 so as to route packets to the proper storage module 310, 312. In another embodiment, fabric switch 315 can be controlled by a processor coupled to VXS payload module 302. In yet another embodiment, fabric switch 315 can operate to route data to and from storage modules 310, 312 based on header data in packets.

Figure 4:
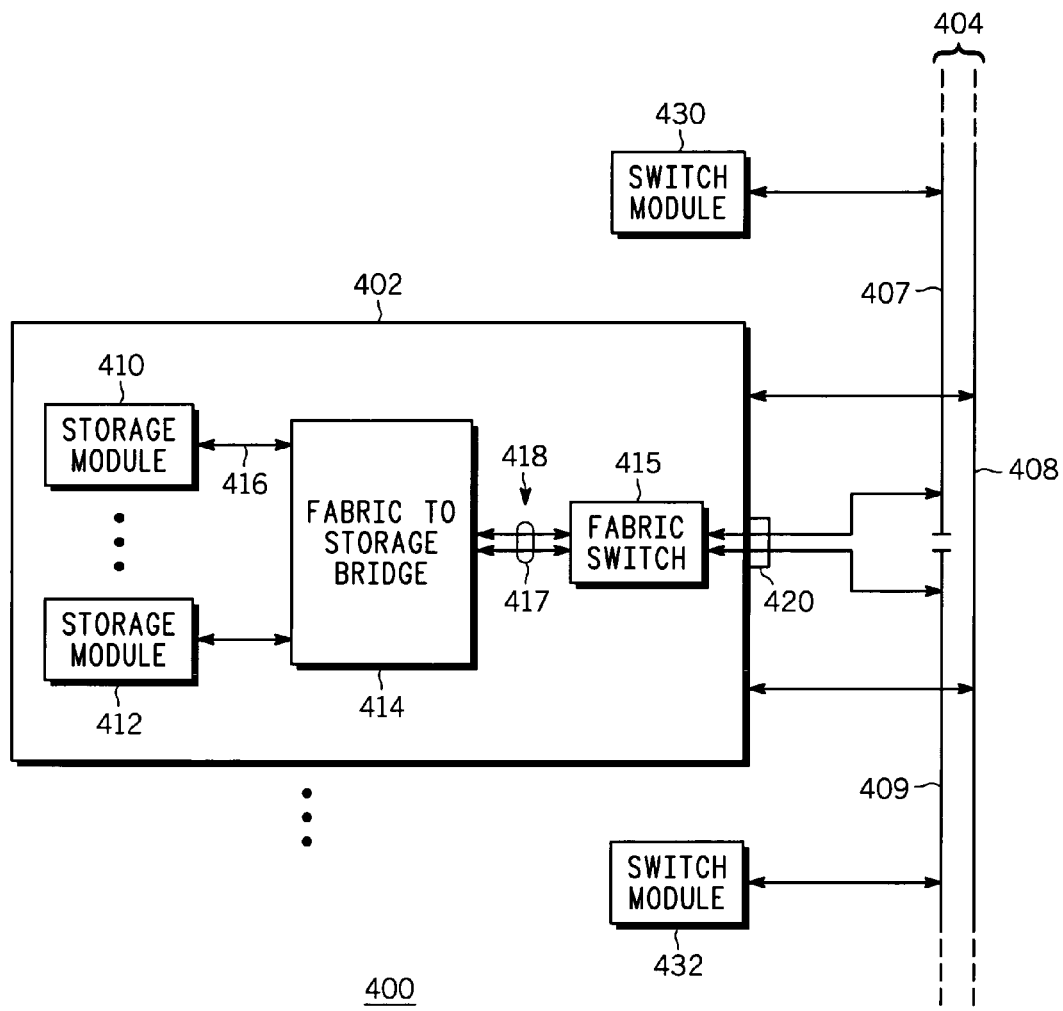
FIG. 4 depicts a multi-service platform system according to still another embodiment of the invention.

FIG. 4 depicts a multi-service platform system 400 according to still another embodiment of the invention. As shown in FIG. 4, switched fabric comprises first switched fabric 407 and second switched fabric 409 both of which are coincident on VXS backplane 404 with parallel bus 408. In an embodiment, first switched fabric 407 can be controlled by first switch module 430, and second switched fabric 409 can be controlled by second switch module 432. Both first switch module 430 and second switch module 432 can be located in separate slots within multi-service platform system 400.

As in FIG. 1, first storage module 410 and second storage module 412 communicate with fabric-to-storage bridge 414 using storage protocol 416. Fabric-to-storage bridge 414 functions to translate data between storage protocol 416 and switched fabric protocol 418 as described above. Storage modules 410, 412 are coupled to VXS backplane 404 though switched fabric connector 420 as described above.

As shown in FIG. 4, VXS payload module 402 includes fabric switch 415 communicatively interposed between fabric-to-storage bridge 414 and switched fabric connector 420. In an embodiment, fabric switch 415 can act as a router for storage modules 410, 412 on VXS payload module 402. Both first storage module 410 and second storage module 412 are coupled to directly communicate with at least one of first switched fabric 407 and second switched fabric 409 via fabric switch 415.

In an embodiment, fabric switch 415 routes incoming and outgoing data such that data is routed to or from first storage module 410 or second storage module 412 respectively, and to or from first switched fabric 407 or second switched fabric 409 respectively. In an embodiment, first storage module 410 can store data exclusively for first switched fabric 407 or exclusively for second switched fabric 409. Also, second storage module 412 can store data exclusively for second switched fabric 409 or first switched fabric 407. In another embodiment, one or more of storage modules 410, 412 can be shared storage for data communicated on first switched fabric 407 and second switched fabric 409. Fabric switch 415 can route data to and from storage modules 410, 412 via fabric switch links 417. In this embodiment, fabric switch 415 can route data packets to storage modules 410, 412 from both first switched fabric 407 and second switched fabric 409 simultaneously.

In an embodiment, fabric switch 415 can be controlled externally by either switch module 430, 432 so as to route packets to the proper storage module 410, 412. In another embodiment, fabric switch 415 can be controlled by a processor coupled to VXS payload module 402. In yet another embodiment, fabric switch 415 can operate to route data to and from storage modules 410, 412 based on header data in packets.

While we have shown and described specific embodiments of the present invention, further modifications and improvements will occur to those skilled in the art. It is therefore, to be understood that appended claims are intended to cover all such modifications and changes as fall within the true spirit and scope of the invention.

The invention claimed is:

1. A multi-service platform system, comprising:
a VXS backplane;
a switched fabric operating on the VXS backplane;
a parallel bus operating coincident with the switched fabric on the VXS backplane;
a VXS payload module coupled to the VXS backplane;
a storage module coupled to the VXS payload module, wherein the storage module is coupled to communicate with the switched fabric; and
a fabric-to-storage bridge module coupled to the VXS payload module, wherein the fabric-to-storage bridge module is configured to interface the storage module to the switched fabric, the switched fabric operating as a data plane to transfer data between VXS payload modules.

2. The multi-service platform system of claim 1, wherein the storage module operates using one of SCSI, IDE/ATA, EIDE, Fibrechannel and ISCSI storage protocols.

3. The multi-service platform system of claim 1, wherein the switched fabric comprises a first switched fabric and a second switched fabric, and wherein the storage module is coupled to store data communicated from at least one of the first switched fabric and the second switched fabric.

4. The multi-service platform system of claim 1, further comprising a second VXS payload module coupled to the VXS backplane, wherein the first and second VXS payload modules communicate with each other through the switched fabric.

5. The multi-service platform system of claim 1, wherein the parallel bus is operable to provide a control plane and a data plane of the VXS backplane, wherein the switched fabric is selectively operable to either replace the parallel bus to provide one of the data plane and the control plane, or contribute to the parallel bus to provide at least one of the data plane and the control plane.

6. A multi-service platform system, comprising:
a VXS backplane;
a switched fabric operating on the VXS backplane;
a parallel bus operating coincident with the switched fabric on the VXS backplane;
a VXS payload module coupled to the VXS backplane;
a first storage module coupled to the VXS payload module, wherein the first storage module is coupled to communicate with the switched fabric;
a second storage module coupled to the VXS payload module, wherein the second storage module is coupled to communicate with the switched fabric; and
a fabric-to-storage bridge module coupled to the VXS payload module, wherein the fabric-to-storage bridge module is configured to interface at least one of the first and second storage modules to the switched fabric, the switched fabric operating as a data plane to transfer data between VXS payload modules.

7. The multi-service platform system of claim 6, further comprising a fabric switch coupled to the VXS payload module, wherein the fabric switch is coupled to selectively communicate data between the switched fabric and one of the first storage module and the second storage module.

8. The multi-service platform system of claim 7, wherein the switched fabric comprises a first switched fabric and a second switched fabric, and wherein the fabric switch communicatively couples one of the first storage module and the second storage module to one of the first switched fabric and the second switched fabric.

9. The multi-service platform system of claim 7, wherein the switched fabric comprises a first switched fabric and a second switched fabric, wherein the fabric switch communicatively couples the first storage module to the first switched fabric, and wherein the fabric switch communicatively couples the second storage module to the second switched fabric.

10. A VXS payload module, comprising:
a storage module coupled to the VXS payload module, wherein the storage module is coupled to communicate with a switched fabric; and
a fabric-to-storage bridge module coupled to interface the storage module to the switched fabric, wherein the switched fabric operates coincident with a parallel bus on a backplane, the switched fabric operating as a data plane to transfer data between VXS payload modules.

11. The VXS payload module of claim 10, wherein the storage module operates using one of SCSI, IDE/ATA, EIDE, Fibrechannel and ISCSI storage protocols.

12. The VXS payload module of claim 10, wherein the switched fabric comprises a first switched fabric and a second switched fabric, and wherein the storage module is coupled to store data communicated from at least one of the first switched fabric and the second switched fabric.

13. A VXS payload module, comprising:
a first storage module coupled to the VXS payload module, wherein the first storage module is coupled to communicate with a switched fabric;
a second storage module coupled to the VXS payload module, wherein the second storage module is coupled to communicate with the switched fabric; and
a fabric-to-storage bridge module coupled to interface at least one of the first storage module and the second storage module to the switched fabric, wherein the switched fabric operates coincident with a parallel bus on a VXS backplane, the switched fabric operating as a data plane to transfer data between VXS payload modules.

14. The VXS payload module of claim 13, further comprising a fabric switch coupled to the VXS payload module, wherein the fabric switch is coupled to selectively communicate data between the switched fabric and one of the first storage module and the second storage module.

15. The VXS payload module of claim 14, wherein the switched fabric comprises a first switched fabric and a second switched fabric, and wherein the fabric switch communicatively couples one of the first storage module and the second storage module to one of the first switched fabric and the second switched fabric.

16. The VXS payload module of claim 14, wherein the switched fabric comprises a first switched fabric and a second switched fabric, wherein the fabric switch communicatively couples the first storage module to the first switched fabric, and wherein the fabric switch communicatively couples the second storage module to the second switched fabric.

17. A method, comprising:
providing a VXS payload module having a storage module;
providing a fabric-to-storage bridge module coupled to interface the storage module to a switched fabric; and
the storage module communicating with the switched fabric on a VXS backplane via the fabric-to-storage bridge module, wherein the switched fabric operates coincident with a parallel bus on the VXS backplane, the switched fabric operating as a data plane to transfer data between VXS payload modules.

18. The method of claim 17, further comprising the storage module operating using one of SCSI, IDE/ATA, EIDE, Fibrechannel and ISCSI storage protocols.

19. The method of claim 17, wherein the switched fabric comprises a first switched fabric and a second switched fabric, and further comprising the storage module storing data communicated from at least one of the first switched fabric and the second switched fabric.

* * * * *